J. CARR.
TOOL CHUCK
APPLICATION FILED FEB. 23, 1921.
1,428,754.
Patented Sept. 12, 1922.
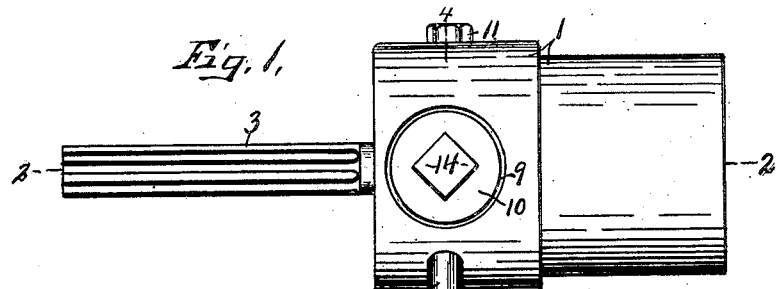
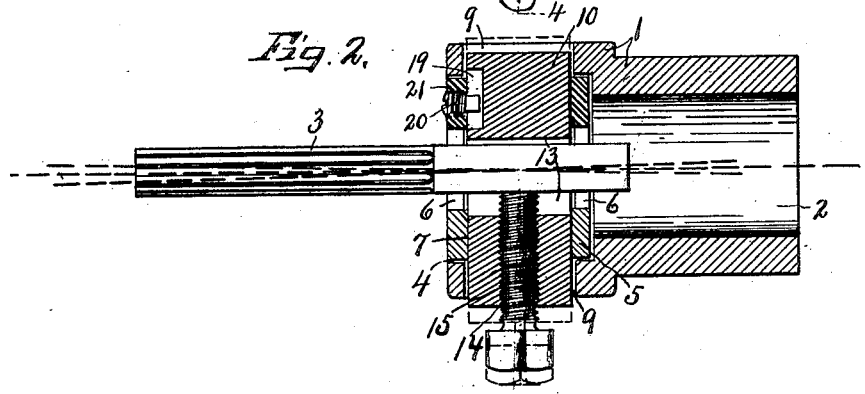
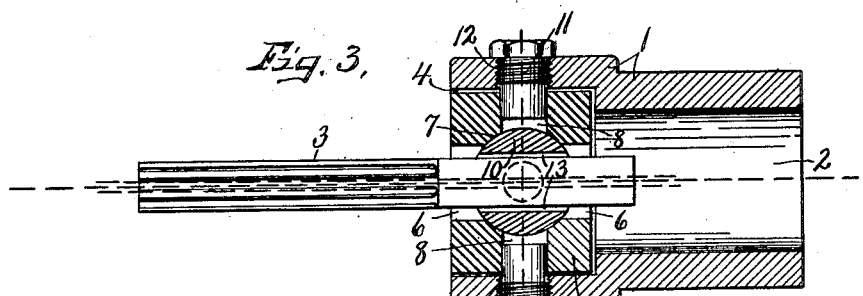
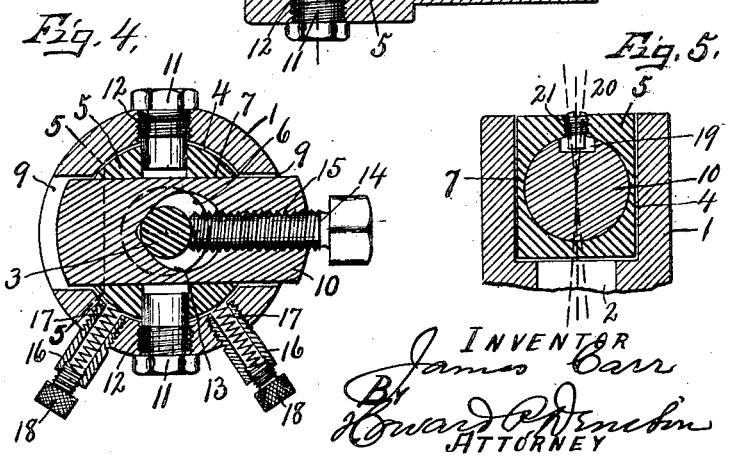
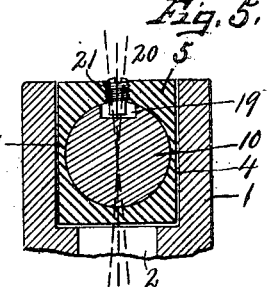
INVENTOR
James Carr
By
Howard P. Denison
ATTORNEY Patented Sept. 12, 1922.

1,428,754

UNITED STATES PATENT OFFICE.

JAMES CARR, OF SYRACUSE, NEW YORK.

TOOL CHUCK.

Application filed February 23, 1921. Serial No. 447,029.

*To all whom it may concern:*

Be it known that I, JAMES CARR, a citizen of the United States, and resident of Syracuse, in the county of Onondaga, in the State of New York, have invented new and useful Improvements in Tool Chucks, of which the following, taken in connection with the accompanying drawing, is a full, clear, and exact description.

This invention relates to certain improvements in tool chucks for turret lathes and analagous machines in which the work is rotated relatively to the tool as the latter is advanced into the work, and is particularly useful as a reamer holder for reaming holes which have been previously bored into the work.

It sometimes happens that the axis of the work-holder and the tool-holder are slightly out of axial alinement, or at an angle to each other, which, of course, would cause an imperfect reaming of the hole or bore, and the main object of my present invention is to provide a tool-holder which will enable the tool to automatically adjust itself axially of the bore, even though the axes of the tool-holder and work-holder may be slightly out of alinement.

Another object is to enable the shank of the reamer to extend entirely through the holder or chuck so that the same reamer may be used for work of different lengths by simply adjusting it back and forth or endwise axially in its holding member.

Other objects and uses relating to specific parts of the device will be brought out in the following description:

In the drawing:

Fig. 1 is a side elevation of my improved tool-holder with a reamer therein.

Fig. 2 and 3 are longitudinal sectional views of the same device taken at right angles to each other. Fig. 2 being taken on line 2–2, Fig. 1.

Fig. 4 is a transverse sectional view taken on line 4–4, Fig. 1.

Fig. 5 is a detail sectional view taken in the plane of line 5–5, Fig. 4.

As illustrated, the chuck comprises a cylindrical head —1— having a lengthwise opening —2— extending centrally therethrough from end to end to receive the shank of a tool such as a reamer —3—, one end of said head being enlarged and provided with a cylindrical coaxial socket —4— of greater diameter than the remaining portion of the opening for receiving a cylindrical collar —5—, which is of appreciably less diameter than the interior diameter of the socket to allow a limited radial and axial rocking movement therein, as will be hereinafter more fully explained.

This collar —5— is provided with a central lengthwise opening —6—, a diametrically extending opening —7— and opposite radial openings —8—, the opening —6— serving to permit the passage of the shank of the tool entirely through the collar, and is of somewhat greater diameter than that of the tool to allow a limited radial movement of said tool therein for a purpose presently described.

The opening —7— extends diametrically through the collar from side to side across the opening —6— in registration with relatively large openings —9— in diametrically opposite sides of the enlarged end of the head —1— for receiving a tool-supporting member —10—, said opening —7— being cylindrical and of greater diameter than the opening —6— to form a bearing for the tool-holder —10—, which is also cylindrical and of substantially the same diameter as the opening —7— to allow it to turn about its axis and also to move axially in said opening.

The openings —8— in the collar —5— are cylindrical and co-axial at right angles to the axis of the opening —7— for receiving the inner cylindrical end of the pair of threaded studs —11— which are screwed in threaded openings —12— in diametrically opposite sides of the head —1—, and constitutes journal bearings or trunnions upon which the collar —5— may turn endwise, and may also slide radially thereon.

The tool-supporting member —10— is preferably of substantially the same length as the diameter of the larger portion of the head —1—, and is provided with a transverse circular opening —13— midway between its ends and of slightly less diameter than the opening —6— with which it is registered for receiving the shank of a tool —3—.

A clamping screw —14— is engaged in a central lengthwise opening —15— in the tool-holder —10— for clamping the tool —3— against the opposite wall of the opening —13—, said opposite wall having a —V— shaped seat in axial alinement with the screw —14— for centering the tool.

In some instances it may be desirable to provide resilient means for counterbalancing the weight of the collar —5— in the socket —4—, and for this purpose I have provided the lower side of the head —1— with a pair of screw bushings —16— screwed in radially threaded openings in said head at opposite sides of the adjacent stud —11— for receiving a pair of coil springs —17— having their inner ends engaged with the adjacent portion of the periphery of the collar —5—, and their outer ends engaged by adjusting screws —18— by which the tension of the springs may be adjusted to support the weight of the collar.

As previously stated, the screw supporting member —10— has a limited, rotary and axial movement, and for this purpose is provided with a peripheral recess —19— for receiving the inner end of a screw stud —20—, which is engaged in a threaded aperture —21— in the outer end face of the collar —5—, said recess being of greater circumferential and axial lengths than the diameter of the adjacent portion of the stud —20— to permit the rotary and axial adjustment of the member —10— previously referred to, as shown more clearly in Figs. 2 and 5.

It is now apparent that the tool-supporting member —10— may receive reamers of various sizes so long as the shanks thereof are within the capacity of the opening —13—, and that when the tool is clamped to said member by means of the screw —14—, it will still be free to move radially and to rock endwise relatively to the axis of the head —1— by reason of the fact that the openings —6— are slightly larger than the opening —13—.

That is, the endwise sliding movement of the tool-supporting member —10— in the collar —5—, and the radial sliding movement of the collar on the inner ends of the trunnions —11— provide for two radial movements of the tools at right angles to each other, and thereby constitutes a universal joint or connection between the head and tool to enable the tool or reamer to automatically adjust itself or aline itself with the bore of the work during the reaming operation in case the axes of the reamer and bore are slightly offset relatively to each other.

It will also be observed that the tool-supporting member —10— has a slight rocking movement about its axis in the collar —5— and that said collar also has a slight rocking movement about the axes of the trunnions —11— at right angles to the axis of the tool-supporting member —10—, thereby constituting another universal joint or connection between the head —1— and tool —3— to enable the tool to automatically adjust or aline itself with the bore in case the axes of said bore and tool are at a slight angle to each other, the angular adjustment of the tool about the axes of the trunnions —11— being indicated by dotted lines in Fig. 2, and the other angular adjustment at right angles to the first named angular adjustment being indicated by the dotted lines shown in Fig. 5.

The radial offset adjustment of the tool by the axial adjustment of the supporting member —10— is indicated by dotted lines in Fig. 2, while the other offset adjustment of the tool by the radial sliding adjustment of the collar —5— upon the trunnions —11— is indicated by dotted lines in Fig. 3.

What I claim is:

1. In a tool chuck, the combination of a rotary head having a lengthwise opening therethrough, a collar pivotally mounted in the opening and slidable lengthwise of its pivotal axis, and a tool supporting member slidable crosswise of and within the collar.

2. In a tool chuck, the combination of a rotary head having a lengthwise socket in one end, a collar pivotally mounted on the head within said socket, and a tool supporting member journaled in the collar to rock about an axis at right angles to the pivotal axis of the collar and slidable lengthwise of its rocking axis.

3. The combination of a rotary head having a central lengthwise opening and pivotal bearings at diametrically opposite sides of said opening, a collar pivotally mounted intermediate its ends upon said pivotal bearings, and an additional member journaled in the collar at right angles to the pivotal axis of said collar, said collar and the additional member being provided with openings therethrough registering with the central lengthwise opening in the head for receiving a driven member, and means for clamping the driven member to said additional member.

4. In a tool chuck of the character described, the combination of a head having a central lengthwise opening and a socket in one end, a collar pivotally mounted upon the head within the socket to tilt endwise and having an independent radial movement relatively to the head, a tool supporting member rotatably mounted in the collar and having an independent axial movement relatively to said collar and head, and means for clamping the tool in said member.

5. The combination with a rotary head having a central lengthwise opening therethrough, a collar pivotally mounted upon the head within the opening to turn about an axis at right angles to that of the head and provided with a lengthwise opening registering with that in the head, an additional member journaled in the collar to turn about an axis at right angles to the pivotal axis of said collar across the lengthwise opening therein, said additional member having an opening registering with the lengthwise openings in the collar and head.

6. The combination with a rotary driving member having a central lengthwise opening and a diametrically extending transverse opening, said head being provided with radial pivotal bearings at diametrically opposite sides of the transverse opening, a collar pivotally mounted on said bearings within the lengthwise opening of the head and provided with a transverse opening registering with the transverse opening in the head, an additional member journaled in the transverse opening in the collar and extended into the transverse opening in the head to rock about an axis at right angles to the pivotal axis of the collar, said additional member being slidable lengthwise of its axis and provided with means for receiving and supporting a driven member.

In witness whereof I have hereunto set my hand this 15th day of February 1921.

JAMES CARR.

Witnesses:
H. E. CHASE.
M. R. COOKE.